Figure 1:
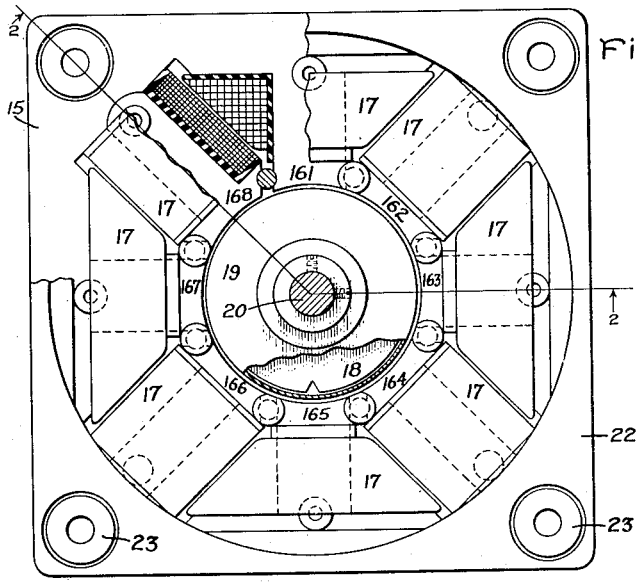

March 8, 1938.  E. H. BANCKER  2,110,655

ELECTRORESPONSIVE DEVICE

Filed Nov. 21, 1936

Inventor:
Elbert H. Bancker,
by Harry E Dunham
His Attorney.

Patented Mar. 8, 1938

2,110,655

UNITED STATES PATENT OFFICE 2,110,655

ELECTRORESPONSIVE DEVICE

Elbert H. Bancker, Schenectady, N. Y., assignor to General Electric Company, a corporation of New York Application November 21, 1936, Serial No. 112,069

8 Claims. (Cl. 175—294)

My invention relates to improvements in electroresponsive devices and more particularly to improvements in protective relays for polyphase alternating current electric systems. My invention in general relates to improvements in electroresponsive devices such as are disclosed and claimed in the copending application of V. E. Verrall, Serial No. 70,580, filed March 24, 1936, for Electroresponsive device, and assigned to the same assignee as this invention, and more particularly to improvements in electroresponsive devices such as are disclosed in the copending application of D. C. Prince, Serial No. 112,067, filed Nov. 21, 1936, for Electroresponsive device, and assigned to the same assignee as this invention. An object of my invention is to provide an improved electroresponsive device which responds to a predetermined function of a group of coexisting polyphase quantities without interference from certain undesired effects which may arise under some conditions.

In the Verrall application, there is disclosed a construction wherein the actuation of a single rotor is controlled by windings on the radially disposed salients of a magnetic member. There is also further disclosed a polyphase relay which comprises a plurality of these units.

In the Prince application there is disclosed an improvement of the Verrall disclosure whereby a single unit device can be made to respond to a predetermined function of two groups of coexisting polyphase quantities. This construction provides a very compact and efficient device which meets the present day protective relay requirements for high torque and speed. However, with this arrangement, there may arise under certain conditions an undesired action which interferes with the correctness of the desired response. For example, if the device is built to respond to a component of the polyphase power of the system for operation on the occurrence of interphase faults, then on the occurrence of a ground fault there may result an undesired effect dependent upon the ground fault power because there is no suitable flux return path for the fluxes due to residual or zero phase sequence component quantities. Since, in some cases, the action due to this residual flux entering the movable current conducting member may be undesired, as stated above, and in other cases may be desired to produce a maximum effect where, for example, an effective ground fault response is desired, it is important that the effect of this residual flux be controlled according to the form of protection desired. Inasmuch as residual fluxes entering the movable current conducting member may arise from other conditions, which result, for example, from certain winding arrangements and also from manufacturing limitations, it is very desirable to be able to eliminate such unwanted effects.

In accordance with my invention, I provide an improved electroresponsive device which is compact and simple in construction and which is efficient and fast in operation. Furthermore, in accordance with my invention, I provide an electroresponsive device wherein suitable return paths are provided for the residual fluxes so as to eliminate undesired actions and to effect the desired response of the device. These and other objects of my invention will appear in more detail hereinafter.

My invention will be better understood from the following description when taken in connection with the accompanying sheet of drawings, and its scope will be pointed out in the appended claims.

Figure 3:
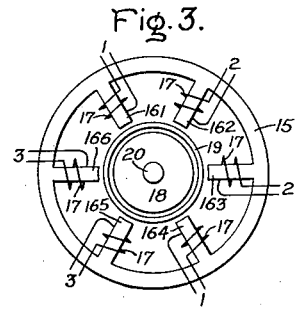
Figure 2:
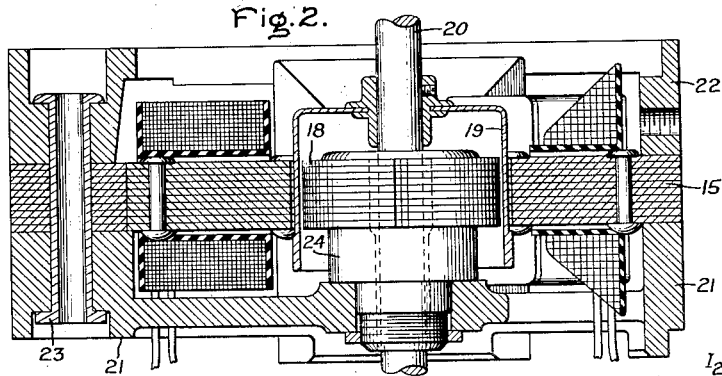
Figure 4:
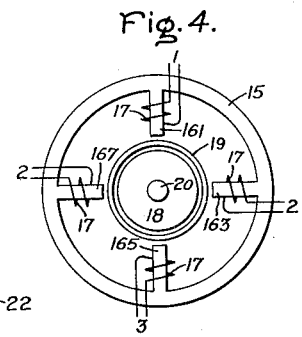
Figure 5:
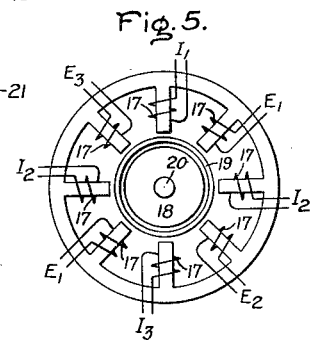
Figure 6:
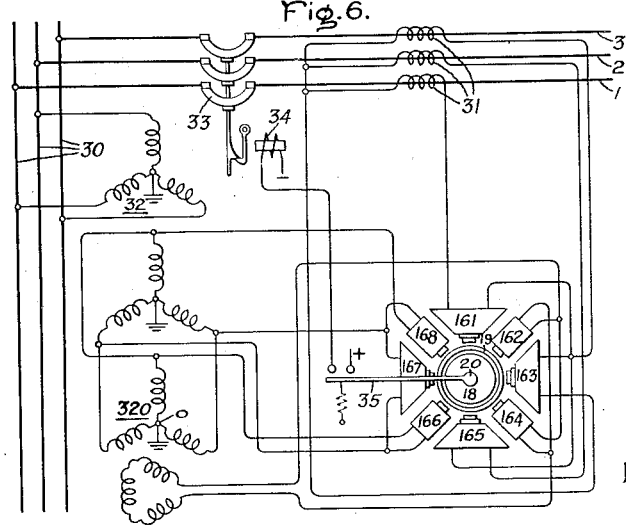

In the accompanying sheet of drawings, Fig. 1 is a plan view partially in section and partially broken away illustrating an electroresponsive device embodying my invention; Fig. 2 is a sectional elevation on the line 2—2 of Fig. 1 as seen in a single plane after revolution of the diagonal sectional part of Fig. 1; Figs. 3, 4, and 5 are diagrammatic views of devices analogous to the device shown in Figs. 1 and 2 for explanatory purposes; and Fig. 6 is a diagrammatic illustration showing the application of an embodiment of my invention illustrated in Figs. 1 and 2 to a polyphase circuit.

The electroresponsive device illustrated in Figs. 1 and 2 is similar in construction to the electroresponsive device disclosed in the Verrall application. As shown in Figs. 1 and 2, this device comprises a hollow magnetic stator 15 having a plurality of inwardly projecting salients 16l-168, inclusive. Certain of these salients, those on the sides, for example, may be integral with the stator and the others insertable in the stator. Windings 17 are provided for energizing the salients and also a central magnetic member 18 concentrically positioned with respect to the ends of the salients whereby to actuate a rotor 19, which is movable in the gaps between the salients and the stator 18, the rotor being secured to a suitably journaled shaft 20. The parts described are assembled as a unit between two end frames 21 and 22, which are held together by suitable means such as rivets 23. The stator 18 is preferably of magnetic material and is mounted on a supporting member or hub 24. This hub is mounted in the bottom frame member 21, as shown. In accordance with my invention, I provide a definite return path for certain fluxes which are produced by the windings 17. As disclosed, this path is in effect a shunt flux path and may be provided by having one of the frame members 21 which supports the stator 18 of suitable magnetic material and also the hub 24.

In Figs. 3, 4, and 5, which are intended as schematic representations of devices analogous to that shown in Figs. 1 and 2, similar reference numbers indicate corresponding parts. In the Prince application referred to herein, there is disclosed a device having six salients, 161–166, inclusive, energized by a set of three-phase quantities 1, 2, 3 in the order 1, 2, 2, 1, 3, 3, as indicated by the numbers at the ends of the respective windings 17. Then the rotating field produced by the windings on the salients 161, 163, and 165 is opposite in torque effect to the rotating field produced by the windings 17 on the salients 162, 164, 166. Other things being equal, the resultant torque on the rotor 19 is zero. Also as disclosed in the Prince application, this action can be obtained with a simplified stator 15 having only four salients for a three-phase system of electric quantities, as shown in Fig. 4, or, in general, $2(n-1)$ salients for an $n$-phase system. Thus, if the windings 17 are energized by three phase quantities, as for example, the phase currents of a three-phase system, in the cyclic order 1, 2, 3, 2, as indicated by the numbers at the ends of the respective windings, then the torque of the rotating field produced by the windings 17 on the salients 161, 163, 165 is opposite to the torque of the rotating field produced on the stator by the salients 161, 167, 165. Other things being equal, the resultant torque is zero and the rotor 19 is not actuated. The windings 17 may be energized by a set of three phase voltages in a similar order and the resultant torque on the rotor would be nothing. If, however, it is desired to obtain a torque which is dependent, for example, on the sum of the products of the currents and the voltages of a polyphase system and have such torque independent of the terms of the second order involving only current or voltage then, as pointed out in the Prince application, alternate salients may be energized by the currents in the three phase conductors of a three-phase system in the cyclic order $I_1, I_2, I_3, I_2$, for example, and the windings 17 on the intermediate salients by three phase voltages of the system in the order $E_1, E_2, E_1, E_3$, as indicated by these letters at the ends of the windings. In this way, the maximum torque is proportional to $$\epsilon EI \cos(\phi + \theta),$$

where E and I represent respectively the currents and the voltages of the circuit, $\phi$ the angle at which the current lags the voltage in the system, and $\theta$ the angle of lead (current leading voltage) at which maximum torque occurs.

In order more clearly to illustrate this torque feature in its application to a three-phase circuit and more particularly to illustrate the purpose of my invention, there is shown schematically in Fig. 6 the connection of the windings of a device analogous to that shown in Figs. 1 and 2 in a three-phase system. This particular connection constitutes a part of the subject matter disclosed in an application of A. J. McConnell, Serial No. 112,068, filed November 21, 1936, for Electroresponsive devices, and assigned to the same assignee as this invention. As illustrated, the three-phase system comprises a three-phase circuit whose phase conductors, designated 1, 2, 3 for simplicity in phase order, may comprise a feeder connected to a station bus 30 through a circuit breaker 33 having a trip coil 34, the respective phase currents may be derived from current transformers 31, and the voltages through a potential transformer 32 connected to the bus 30, a further Y-open delta potential transformer 320 may be connected to be energized from the bus 30 through the transformer 32 in order to provide zero phase sequence voltage in case of ground faults. In the schematic representation of the device in Fig. 6, the salient windings are indicated by the salient numbers, for simplicity. The relay device is shown as having a circuit controlling member 35 which is arranged to control contacts in circuit with the trip coil 34 whereby to control the opening of the circuit breaker 33.

As shown in Fig. 6, the salients 161, 165, 166, and 168 are energized respectively by the currents $I_1$, $I_2$, and the phase voltages $E_{12}$ and $E_{23}$. The fluxes in these salients co-operate to produce a polyphase power directional torque. The windings on the salients 162 and 164 are connected in the open delta of the transformer 320 so as to be energized by the residual or zero phase sequence voltage of the system. The polarity of the connection of the winding on the salient 162 is reversed relatively to the polarity of the connection of the winding on the salient 164. The winding on the salient 163 is connected to be energized by the residual current of the circuit and for this purpose is connected to the residual lead of the current transformers 31. The windings on the salients 162, 163, 164 accordingly provide the fluxes which produce a ground directional torque dependent on the flow of ground fault power. The salient 167 is energized by the phase voltage $E_{31}$ reversed in polarity. The windings on the salients 166, 167, and 168 provide a voltage restraint torque which is opposed to the power directional torque under predetermined system conditions. Such a relay, as shown in Figs. 1 and 2, when connected as shown in Fig. 6, then combines in a single device a response to polyphase power with a predetermined voltage restraint and to zero sequence power flow.

It will be observed, however, that with an arrangement such as is shown in Fig. 6 certain salients, viz., 162, 163, and 164, are connected to be energized by zero phase sequence quantities and accordingly the fluxes in these salients would tend to pass through stator 18 and return to the magnetic member 15 by way of the other salients. Such return fluxes would tend to establish miscellaneous torque effects on the rotor 19 by virtue of their reaction with the fluxes in the other poles. Such miscellaneous torque effects obviously decrease the effective accuracy of the device in its intended response. For example, the torque criterion of a ground fault would be the zero phase sequence power and would be measured by a product of the zero phase sequence current and zero phase sequence voltage, and not by miscellaneous products of these phase sequence quantities and other line currents and voltages. In order to avoid these miscellaneous undesired torques, the shunt flux path provided in accordance with my invention eliminates these undesired torques by providing a return path for the residual fluxes due to zero phase sequence quantities without the necessity for these fluxes entering other salients, which brings about the tendency to erroneous action. Thus, for example, the zero phase flux of the current energized salient 163 may pass directly into the stator 18 and thence into the magnetic hub supporting this stator and from there into the magnetic end frame 21 and thence back to the magnetic member 15 without interacting with other salients to produce what may be termed mongrel torque effects.

While Fig. 6 shows one particular arrangement wherein my invention is effective in eliminating extraneous torque effects, my invention is of course not limited to this particular application, since there are many cases where residual fluxes may arise and tend to affect the proper responsiveness of the device. For example, in manufacturing processes, it is seldom commercially possible to achieve the theoretically perfect design. In other words, there is a divergence between theory and practice dependent upon commercial limitations in manufacturing. Thus, even though none of the windings of the device were connected to be energized by zero phase sequence quantities of a circuit, there may be an actual residual flux even though the windings are connected in a balanced three-phase circuit because of a slight difference in the windings as to turn numbers, turn spacing, insulation, mounting on the salients, lack of symmetry in the magnetic member or the parts associated therewith, etc. However, if a shunt magnetic path is provided in accordance with my invention, these residual fluxes are rendered harmless in their deleterious effects upon the responsiveness of the device.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. An electroresponsive device comprising a magnetic stator in the form of a hollow square, said stator having a plurality of inwardly projecting salients, a magnetic member centrally positioned relatively to and spaced from the inner ends of said salients, a rotor of electric current conducting material between said central magnetic member and the inner ends of said salients, windings for energizing said salients, and means for establishing a shunt magnetic path for the residual flux of said windings entering said rotor.

2. An electroresponsive device comprising a magnetic member having a plurality of radially disposed salients, a rotor having an electric current conducting path concentrically positioned relatively to the ends of said salients, energizing windings on said salients, and means for establishing a shunt flux path for the residual flux of said salients entering said conducting path.

3. An electroresponsive device comprising a hollow magnetic stator having a plurality of inwardly projecting salients, windings for energizing said salients, an end frame on each face of said stator, one of said end frames being of magnetic material, means for fastening together the end frames and stator, a central magnetic member supported by the magnetic end frame and centrally positioned relatively to and spaced from the inner ends of said salients and a rotatably mounted cylindrical member of electric current conducting material movable in the gaps between said central magnetic member and the inner ends of said salients.

4. An electroresponsive device comprising a magnetic stator having a plurality of radially disposed salients, energizing windings on said salients, a magnetic supporting member abutting said stator in the plane of said salients, a central magnetic member supported by said supporting member and centrally positioned relatively to and spaced from the inner ends of said salients, and a rotor having an electric current conducting path mounted for rotation in the gaps between said central magnetic member and the inner ends of said salients.

5. An electroresponsive device comprising a magnetic member having a plurality of radially disposed salients, a rotor having an electric current conducting path concentrically positioned relatively to the ends of said salients, energizing windings on said salients, and frames constituting an enclosure for said magnetic member, rotor and windings, one of said frames being of magnetic material and means including said magnetic end frame for establishing a return flux path for any residual flux of said windings entering said current-conducting path.

6. An electroresponsive device comprising a single movable member having an electric current conducting path, and means for controlling the movement of said member in accordance with the magnitudes and phase displacements between predetermined electric quantities of two groups of coexisting polyphase quantities, including a magnetic member having a plurality of salients, windings on said salients and means for establishing a return flux path for any residual flux of said windings entering said current conducting path.

7. An electroresponsive device comprising a magnetic member having a plurality of salients, a movable member having an electric current conducting path disposed adjacent the ends of said salients, energizing windings on certain of said salients, and means for establishing a shunt flux path for the residual flux of said salients entering said current conducting path.

8. An electroresponsive device comprising a magnetic stator having a plurality of salients, a cooperating magnetic stator disposed adjacent the ends of said salients, energizing windings on certain of said salients, a magnetic member providing a return flux path between said stators, and a rotor having an electric current conducting path mounted for movement between said stators.

ELBERT H. BANCKER.